PROCESS FOR THE PREPARATION OF α-HALO-GENO-β-METHYLVALERIC ACID DERIVATIVES

Issei Iwai and Takuo Konotsune, Tokyo, Japan, assignors to Sankyo Company, Limited, Tokyo, Japan
No Drawing. Filed Aug. 2, 1961, Ser. No. 128,660
Claims priority, application Japan Aug. 11, 1960
4 Claims. (Cl. 260—487)

This invention relates to a process for preparing α-halogeno-β-methylvaleric acid derivatives useful as an intermediate for production of isoleucine. Particularly, it relates to a process for preparing α-halogeno-β-methylvaleric acid derivatives having the general formula

(I)

wherein R is hydrogen, an alkyl radical having from 3 to 8 carbon atoms such as propyl, n-butyl, sec.-butyl, tert-butyl, n-amyl, i-amyl, hexyl, heptyl or octyl radical, a phenyl substituted methyl radical such as monophenyl-methyl, diphenylmethyl or triphenylmethyl radical, menthyl radical or bornyl radical and X is bromine or iodine atom.

Heretofore, it is known that α-bromo-β-methylvaleric acid or esters thereof may be produced by reacting sec-butyl halogenides with malonic acid or ester thereof in the presence of sodium alcoholate followed by bromination and decarboxylation or by brominating β-methylvaleric acid esters prepared from methylethylketone and monobromoacetic acid esters or hydrolysis product of the former esters. It is also known that α-bromo-β-methylvaleric acid or esters thereof obtained by aforementioned processes may be converted by reaction with potassium iodide to α-iodo-β-methylvaleric acid or esters thereof. These processes, however, are disadvantageous from the industrial point of view, because, for example, production of α-halogeno-β-methylvaleric acid derivatives by the processes involves a number of reaction steps to result in complicated modes of operation as well as in a long period of time for obtaining the desired product.

It is an object of this invention to provide a process capable of producing α-halogeno-β-methylvaleric acid derivatives having the aforementioned Formula I easily and in a short period of time without the above described disadvantages accompanied by the production according to known processes. Other objects of this invention will be apparent from the descriptions herein below.

α-Halogeno-β-methylvaleric acid derivatives having the aforementioned general Formula I may be prepared by reacting crotonic acid derivatives having the general formula $$CH_3CH=CHCOOR \quad (II)$$

wherein R has the same meaning as above with ethylmagnesium halogenide in the presence or absence of cuprous chloride as a catalyst, subjecting the reaction mixture to reaction with bromine or iodine by addition thereof to the former mixture and treating the resulting reaction mixture with a diluted mineral acid or a saturated solution of ammonium chloride. The process is extremely advantageous from the industrial point of view, because these reactions may be carried out successively in one and the same reaction vessel with a high yield of the desired product.

These reactions may be chemically shown as follows:

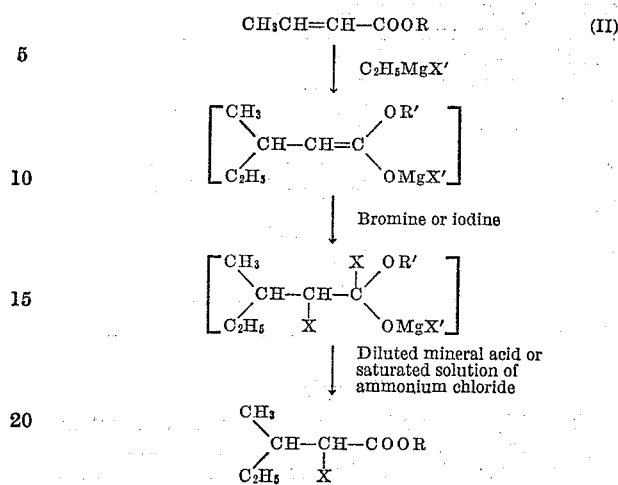

In the above described equation X' represents a halogen atom, R' represents —MgX' or the same alkyl radical having from 3 to 8 carbon atoms, phenyl substituted methyl radical, menthyl radical or bornyl radical as defined above with R and X and R have the same meaning as above.

Reaction of crotonic acid derivatives having the above described Formula II with ethylmagnesium halogenide is effected by adding a solution of the above described crotonic acid derivative in an inert solvent such as ether, benzene or tetrahydrofuran dropwise to an ether solution of ethylmagnesium halogenide and allowing the resulting mixture to stand with stirring at temperature of about −5° C. to about 34° C. The reaction is completed in from about 30 min. to several hours. After completion of the reaction, the reaction mixture is chilled at temperature below room temperature, for example, at −20–0° C. and to the chilled mixture is added bromine or iodine in an amount as much as about 0.8–2.0 mol. per mol. of the above described crotonic acid derivative, followed by stirring for a short period of time, for example, for about 10–30 min. to proceed reaction. The reaction mixture is then poured into a mixture of ice and a diluted (about 5–10%) mineral acid such as hydrochloric or sulfuric acid or a mixture of ice and a saturated solution of ammonium chloride. After completion of the reaction the organic layer is isolated, washed with water and dried. From the dried organic layer is distilled off the solvent and the residue is distilled under reduced pressure.

α-Halogeno-β-methylvaleric acid derivatives having the above described general Formula I obtained by the process according to the present invention may be converted to isoleucine by any of known methods.

For example, convertion to isoleucine may be conducted by reaction of α-bromo- or iodo-β-methylvaleric acid with aqueous ammonia or by hydrolysis and subsequent reaction with aqueous ammonia of α-bromo-β-methylvaleric acid esters. α-Iodo-β-methylvaleric acid esters may be converted to isoleucine by subjecting the former to hydrolysis and reaction with aqueous ammonia in the arbitrary order.

Examples of this invention are given below. These examples, however, are to be understood as illustrative but not as limiting of the scope of this invention.

Example 1

A Grignard solution is prepared from 3 g. of metallic magnesium, 16 g. of ethyl bromide and 20 ml. of dry ether. A solution of 4.3 g. of crotonic acid in 20 ml. of dry ether is added dropwise to the Grignard solution with stirring at room temperature. Stirring is continued for additional one hour. The resulting reaction mixture is chilled to $-10°$ C., followed by dropwise addition of 8 g. of dry bromine. The mixture is stirred for additional 10 min. The resulting reaction mixture is poured into a mixture of ice and diluted hydrochloric acid and the organic layer separated is isolated. The organic layer is washed once with water and then with three portions of 10% solution of $Na_2CO_3$. The alkaline layer thus obtained is acidified with 20% sulfuric acid with cooling and the organic layer is then extracted with ether. The ether extract is washed with water, dried over $Na_2SO_4$ and subjected to distillation under reduced pressure to give 2.5 g. of $\alpha$-bromo-$\beta$-methyl-valeric acid boiling at 138–139° C./20 mm. Hg.

Example 2

To a Grignard solution prepared from 3 g. of metallic magnesium, 16 g. of ethyl bromide and 20 ml. of dry ether are added 50 mg. of cuprous chloride. As in Example 1, a solution of 4.3 g. of crotonic acid in 20 ml. of dry ether is dropwise added to the mixture with stirring, followed by reaction at room temperature for additional one hour. The resulting reaction mixture is chilled to $-15°$ C., followed by dropwise addition of 8 g. of dry bromine. The resulting mixture is treated in the same way as in Example 1 to give 3.2 g. of $\alpha$-bromo-$\beta$-methylvaleric acid boiling at 107–109° C./3 mm. Hg.

Example 3

A Grignard solution is prepared from 6 g. of metallic magnesium, 32.8 g. of ethyl bromide and 80 ml. of dry ether and 100 mg. of cuprous chloride is added to the solution. A solution of 14.2 g. of sec.-butyl crotonate in 80 ml. of dry ether is added dropwise to the Grignard solution with stirring under ice-cooling. Stirring is continued for additional 30 min. The resulting reaction mixture is chilled to $-10°$ C., followed by dropwise addition of 27 g. of dry bromine. The mixture is stirred for additional 30 min. The resulting reaction mixture is poured into a mixture of ice and diluted hydrochloric acid and the ether layer separated is isolated. The ether layer is washed with $Na_2S_2O_3$ solution, $NaHCO_3$ solution and water successively, dried over $Na_2SO_4$ and subjected to distillation under reduced pressure to give 16.6 g. of sec.-butyl $\alpha$-bromo-$\beta$-methyl-valeriate boiling at 88–90° C./5 mm. Hg.

*Analysis.*—Calcd. for $C_{10}H_{19}O_2Br$: C, 47.8; H, 7.57; Br, 33.14. Found: C, 47.93; H, 7.90; Br, 32.41.

Example 4

A Grignard solution is prepared from 8.4 g. of metallic magnesium, 42 g. of ethyl bromide and 160 ml. of dry ether and 150 mg. of cuprous chloride is added to the solution. A solution of 20 g. of t-butyl crotonate in 100 ml. of dry ether is added dropwise to the Grignard solution with stirring under ice-cooling. Stirring is continued for additional one hour. The resulting reaction mixture is chilled to $-10°$ C., followed by dropwise addition of 40 g. of dry bromine. The mixture is stirred for additional 10 min. The resulting reaction mixture is poured into a mixture of ice and a saturated solution of ammonium chloride and the ether layer separated is isolated. The ether layer is washed with $Na_2S_2O_3$ solution, $NaHCO_3$ solution and water successively, dried over $Na_2SO_4$ and subjected to distillation under reduced pressure to give 13.9 g. of t-butyl $\alpha$-bromo-$\beta$-methyl valeriate boiling at 79–80° C./8 mm. Hg.

*Analysis.*—Calcd. for $C_{10}H_{19}O_2Br$: C, 47.8; H, 7.57; Br, 33.14. Found: C, 46.70; H, 7.27; Br, 32.58.

Example 5

A Grignard solution is prepared from 1.05 g. of metallic magnesium, 4.9 of ethyl bromide and 20 ml. of dry ether and 20 mg. of cuprous chloride is added to the solution. A solution of 4 g. of e-menthyl crotonate in 10 ml. of dry ether is added dropwise to the Grignard solution with stirring under ice-cooling. Stirring is continued for additional 2.5 hours. The resulting reaction mixture is chilled to $-15°$ C., followed by dropwise addition of 5 g. of dry bromine. The mixture is stirred for additional one hour. The resulting reaction mixture is poured into a mixture of ice and diluted hydrochloric acid and the ether layer separated is isolated. The ether layer is washed with $Na_2S_2O_3$ solution, $NaHCO_3$ solution and water successively, dried over $Na_2SO_4$ and subjected to distillation under reduced pressure to give 2.9 g. of e-methyl $\alpha$-bromo-$\beta$-methyl-valeriate boiling at 112–113° C./0.2 mm. Hg.

*Analysis.*—Calcd. for $C_{16}H_{29}O_2Br$: C, 57.7; H, 8.71; Br, 24.0. Found: C, 59.2; H, 8.94; Br, 23.32. $[\alpha]_D^{22}=-48.70$ (C=1.7 in ethanol).

Example 6

A Grignard solution is prepared from 1.78 g. of metallic magnesium, 8 g. of ethyl bromide and 32 ml. of dry ether and 75 mg. of cuprous chloride is added to the solution. A solution of 6.5 g. of $\alpha$-bornyl crotonate in 30 ml. of dry ether is added dropwise to the Grignard solution with stirring under ice-cooling. Stirring is continued for additional one hour. The resulting reaction mixture is chilled to $-10°$ C., followed by dropwise addition of 11.7 g. of dry bromine. The mixture is stirred for additional 10 min. The resulting reaction mixture is poured into a mixture of ice and a saturated solution of ammonium chloride and the ether layer separated is isolated. The ether layer is washed with $Na_2S_2O_3$ solution, $NaHCO_3$ solution and water successively, dried over $Na_2SO_4$ and subjected to distillation under reduced pressure to give 2.5 g. of d-bornyl $\alpha$-bromo-$\beta$-methyl-valeriate boiling at 95–96° C./0.15 mm. Hg.

*Analysis.*—Calcd. for $C_{16}H_{27}O_2Br$: C, 57.0; H, 8.16; Br. 24.2. Found: C, 57.93; H, 8.21; Br, 23.28. $[\alpha]_D^{30}=+18.95°$ (C=1.16 in ethanol).

Example 7

A Grignard solution is prepared from 6.2 g. of metallic magnesium, 28 g. of ethyl bromide and 50 ml. of dry ether and 50 mg. of cuprous chloride is added to the solution. A solution of 8.6 of crotonic acid in 20 ml. of dry ether is added dropwise to the Grignard solution with stirring at room temperature. Stirring is continued for additional two hours. The resulting reaction mixture is chilled to $-20°$ C., followed by portionwise addition of 25 g. of iodine. The mixture is stirred for additional 30 min. The resulting reaction mixture is poured into a mixture of ice and diluted hydrochloric acid and the ether layer separated is isolated. The ether layer is washed with $Na_2S_2O_3$ solution, $NaHCO_3$ solution and water successively, dried over $Na_2SO_4$ and subjected to distillation under reduced pressure to give 7.6 g. of pale yellow liquid of $\alpha$-iodo-$\beta$-methyl-valeric acid boiling at 110–112° C./1 mm. Hg.

*Analysis.*—Calcd. for $C_6H_{11}O_2I$: C, 29.95; H, 4.54; I, 52.5. Found: C, 30.77; H, 4.94; I, 50.82.

Example 8

A Grignard solution is prepared from 8.4 g. of metallic magnesium, 42 g. of ethyl bromide and 160 ml. of dry ether and 150 mg. of cuprous chloride is added to the solution. A solution of 20 g. of t-butyl crotonate in 100 ml. of dry ether is added dropwise to the Grignard solution with stirring under ice-cooling. Stirring is continued for additional one hour. The resulting reaction mixture is chilled to $-10°$ C., followed by portionwise addition of 64 g. of dry iodine. The mixture is stirred for additional 30 min. The resulting reaction mixture is poured into a mixture of ice and a saturated solution of ammonium chloride and the ether layer separated is isolated. The ether layer is washed with Na$_2$S$_2$O$_3$ solution NaHCO$_3$ solution and water succcessively, dried over Na$_2$SO$_4$ and subjected to distillation under reduced pressure to give 20.8 g. of t-butyl α-iodo-β-methylvaleriate boiling at 72–73° C./1 mm. Hg.

*Analysis.*—Calcd. for C$_{10}$H$_{19}$O$_2$I: C, 40.3; H, 6.38; I, 42.6. Found: C, 40.24; H, 6.46; I, 42.4.

*Example 9*

A Grignard solution is prepared from 3.6 g. of metallic magnesium, 18 g. of ethyl bromide and 80 ml. of dry ether and 100 mg. of cuprous chloride is added to the solution. A solution of 14.2 g. of sec.-butyl crotonate in 50 ml. of dry ether is added dropwise to the Grignard solution with stirring under ice-cooling. Stirring is continued for additional one hour. The resulting reaction mixture is chilled to −10° C., followed by portionwise addition of 26 g. of dry iodine. The mixture is stirred for additional 30 min. The resulting reaction mixture is poured into a mixture of ice and a saturated solution of ammonium chloride and the ether layer is isolated. The ether layer is washed with Na$_2$S$_2$O$_3$ solution, NaHCO$_3$ solution and water successively, dried over Na$_2$SO$_4$ and subjected to distillation under reduced pressure to give 18.8 g. of sec.-butyl α-iodo-β-methylvaleriate boiling at 80–81° C./0.8 mm. Hg.

*Analysis.*—Calcd. for C$_{10}$H$_{19}$O$_2$I: C, 40.3; H, 6.38; I, 42.6. Found: C, 40.43; H, 6.53; I, 41.79.

*Example 10*

A Grignard solution is prepared from 5.25 g. of metallic magnesium, 25 g. of ethyl bromide and 180 ml. of dry ether and 100 mg. of cuprous chloride is added to the solution. A solution of 20 g. of e-menthyl crotonate in 50 ml. of dry ether is added dropwise to the Grignard solution with stirring under ice-cooling. Stirring is continued for additional one hour. The resulting reaction mixture is chilled to −10° C., followed by portionwise addition of 48 g. of dry iodine. The mixture is stirred for additional 30 min. The resulting reaction mixture is poured into a mixture of ice and a saturated solution of ammonium chloride and the ether layer separated is isolated. The ether layer is washed with Na$_2$S$_2$O$_3$ solution, NaHCO$_3$ solution and water successively, dried over Na$_2$SO$_4$ and subjected to distillation under reduced pressure to give 13.2 g. of e-menthyl α-iodo-β-methylvaleriate boiling at 110–120° C./5×10$^{-5}$ mm. Hg. (bath temperature).

*Analysis.*—Calcd. for C$_{16}$H$_{29}$O$_2$I: C, 50.6; H, 7.63; I, 33.4. Found: C, 51.12; H, 7.31; I, 32.5. [α]$_D^{30}$= −30.8° (C=1.9 in ethanol).

*Example 11*

A Grignard solution is prepared from 1.78 g. of metallic magnesium, 8 g. of ethyl bromide and 32 ml. of dry ether and 75 mg. of cuprous chloride is added to the solution. A solution of 6.5 g. of d-bornyl crotonate in 30 ml. of dry ether is added dropwise to the Grignard solution with stirring under ice-cooling. Stirring is continued for additional one hour. The resulting reaction mixture is chilled to −10° C., followed by portionwise addition of 20.5 g. of dry iodine. The mixture is stirred for additional 30 min. The resulting reaction mixture is poured into a mixture of ice and a saturated solution of ammonium chloride and the ether layer separated is isolated. The ether layer is washed with Na$_2$S$_2$O$_3$ solution, NaHCO$_3$ solution and water successively, dried over Na$_2$SO$_4$ and subjected to distillation under reduced pressure to give 1.6 g. of d-bornyl α-iodo-β-methylvaleriate boiling at 125–135° C./8×10$^{-4}$ mm. Hg (bath temperature).

*Analysis.*—Calcd. for C$_{10}$H$_{27}$O$_2$I: C, 50.8; H, 7.14; I, 33.6. Found: C, 52.1; H, 7.56; I, 32.18.

We claim:

1. A process for preparing a compound having the general formula

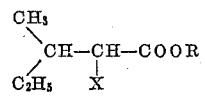

wherein R is a member selected from the group consisting of hydrogen atom, alkyl radicals having from 3 to 8 carbon atoms, phenyl substituted methyl radicals, menthyl radical and bornyl radical and X is a member selected from the group consisting of bromine and iodine which comprises reacting a compound having the general formula

wherein R has the same meaning as above with ethylmagnesium halogenide, subjecting the reaction mixture to reaction with a halogen selected from the group consisting of bromine and iodine and treating the resulting reaction mixture with a hydrolyzing agent selected from the group consisting of diluted mineral acids and saturated solution of ammonium chloride.

2. A process for preparing a compound having the general formula

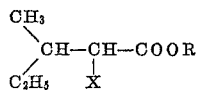

wherein R is a member selected from the group consisting of hydrogen atom, alkyl radicals having from 3 to 8 carbon atoms, phenyl substituted methyl radicals, menthyl radical and bornyl radical and X is a member selected from the group consisting of bromine and iodine which comprises reacting a compound having the general formula

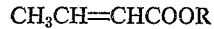

wherein R has the same meaning as above with ethylmagnesium halogenide in the presence of cuprous chloride, subjecting the reaction mixture to reaction with a halogen selected from the group consisting of bromine and iodine and treating the resulting reaction mixture with a hydrolyzing agent selected from the group consisting of diluted mineral acids and saturated solution of ammonium chloride.

3. A process for preparing a compound having the general formula

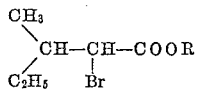

wherein R is a member selected from the group consisting of hydrogen atom, alkyl radicals having from 3 to 8 carbon atoms, phenyl substituted methyl radicals, menthyl radical and bornyl radical which comprises reacting a compound having the general formula

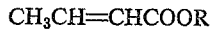

wherein R has the same meaning as above with ethylmagnesium halogenide in the presence of cuprous chloride, subjecting the reaction mixture to reaction with bromine and treating the resulting reaction mixture with a hydrolyzing agent selected from the group consisting of diluted mineral acids and saturated solution of ammonium chloride.

4. A process for preparing a compound having the general formula

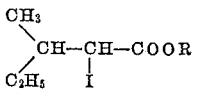

wherein R is a member selected from the group consisting of hydrogen atom, alkyl radicals having from 3 to 8 carbon atoms, phenyl substituted methyl radicals, menthyl radical and bornyl radical which comprises reacting a compound having the general formula $$CH_3CH=CHCOOR$$

wherein R has the same meaning as above with ethylmagnesium halogenide in the presence of cuprous chloride, subjecting the reaction mixture to reaction with iodine and treating the resulting reaction mixture with a hydrolyzing agent selected from the group consisting of diluted mineral acids and saturated solution of ammonium chloride.

No references cited.